(12) United States Patent
Spitler et al.

(10) Patent No.: US 6,890,510 B2
(45) Date of Patent: May 10, 2005

(54) PROCESS FOR MAKING LITHIUM TITANATE

(75) Inventors: Timothy M. Spitler, Fernley, NV (US); Jan Prochazka, Reno, NV (US)

(73) Assignee: Altair Nanomaterials Inc., Reno, NV (US)

( * ) Notice: Subject to any disclaimer, the term of this patent is extended or adjusted under 35 U.S.C. 154(b) by 295 days.

(21) Appl. No.: 10/199,212

(22) Filed: Jul. 19, 2002

(65) Prior Publication Data

US 2003/0017104 A1 Jan. 23, 2003

Related U.S. Application Data

(60) Provisional application No. 60/306,683, filed on Jul. 20, 2001.

(51) Int. Cl.$^7$ ............... C01G 23/00; H01M 4/58
(52) U.S. Cl. .................. 423/598; 429/231.5
(58) Field of Search ............... 423/594.15, 598; 429/231.5, 231.95

(56) References Cited

U.S. PATENT DOCUMENTS

| | | |
|---|---|---|
| 3,903,239 A | 9/1975 | Berkovich |
| 4,012,338 A | 3/1977 | Urwin |
| 4,065,544 A | 12/1977 | Hamling et al. |
| 4,482,642 A | 11/1984 | Ettlinger et al. |
| 4,649,037 A | 3/1987 | Fanelli et al. |
| 4,842,832 A | 6/1989 | Inoue et al. |
| 4,923,682 A | 5/1990 | Roberts et al. |
| 4,944,936 A | 7/1990 | Lawhorne |
| 4,999,182 A | 3/1991 | Baumard et al. |
| 5,036,037 A | 7/1991 | Kladnig et al. |
| 5,068,056 A | 11/1991 | Robb |
| 5,114,702 A | 5/1992 | Pederson et al. |
| 5,478,671 A | * 12/1995 | Idota ............ 429/221 |
| 5,550,095 A | 8/1996 | Naito et al. |
| 5,562,763 A | 10/1996 | Bruckner et al. |
| 5,654,114 A | * 8/1997 | Kubota et al. ............ 429/338 |
| 5,698,177 A | 12/1997 | Pratsinis et al. |
| 5,698,205 A | 12/1997 | Brückner et al. |
| 5,714,260 A | 2/1998 | Okuda et al. |
| 5,770,310 A | 6/1998 | Noguchi et al. |

(Continued)

FOREIGN PATENT DOCUMENTS

| | | |
|---|---|---|
| DE | 197 25 616 C | 11/1998 |
| EP | 0 016 583 A | 10/1980 |

(Continued)

OTHER PUBLICATIONS

Patent Abstracts of Japan, vol. 007, No. 086 (C–161), Apr. 9, 1983 & JP 58 015031 A (Taijirou Okabe), Jan. 28, 1983 abstract.

(Continued)

Primary Examiner—Wayne A. Langel
Assistant Examiner—Jonas N. Strickland
(74) Attorney, Agent, or Firm—Brinks Hofer Gilson and Lione; G. Peter Nichols

(57) ABSTRACT

A process is provided for making lithium titanate of closely controlled particle size in the range 5 nm to 2000 nm. The process includes re-firing lithium titanate under controlled conditions so that crystallites of the desired particle size are grown. The lithium titanate may be derived from any suitable source. A suitable source of lithium titanate can be from a process that includes evaporation of a blend that contains lithium and titanium to form a mixture containing lithium and titanium compounds that are subsequently calcined to form lithium titanate. The blend of titanium and lithium may be derived from a variety of titanium and lithium precursor materials.

25 Claims, 6 Drawing Sheets

U.S. PATENT DOCUMENTS

| | | | |
|---|---|---|---|
| 5,833,892 A | | 11/1998 | Gurav et al. |
| 5,840,111 A | | 11/1998 | Wiederhoft et al. |
| 6,001,326 A | | 12/1999 | Kim et al. |
| 6,037,289 A | | 3/2000 | Chopin et al. |
| 6,099,634 A | | 8/2000 | Uenishi et al. |
| 6,139,815 A | * | 10/2000 | Atsumi et al. ............... 423/598 |
| 6,440,383 B1 | * | 8/2002 | Duyvesteyn et al. ......... 423/611 |
| 6,645,673 B2 | * | 11/2003 | Yamawaki et al. ...... 429/231.5 |
| 6,749,648 B1 | * | 6/2004 | Kumar et al. ............... 29/623.1 |
| 2001/0031401 A1 | | 10/2001 | Yamawaki et al. |

FOREIGN PATENT DOCUMENTS

| | | | | |
|---|---|---|---|---|
| EP | 0090913 A1 | * | 10/1983 | ............ H01M/8/14 |
| EP | 0 356 132 | | 2/1990 | |
| EP | 0 617 474 A | | 9/1994 | |
| EP | 0 646 974 | | 4/1995 | |
| EP | 0 832 847 | | 4/1998 | |
| EP | 1057783 A2 | * | 12/2000 | ........... C01G/23/00 |
| GB | 481892 | | 3/1938 | |
| GB | 497694 | | 12/1938 | |
| GB | 2 166 126 A | | 4/1986 | |
| WO | WO 97/10185 A | | 3/1997 | |
| WO | WO 97/30130 A | | 8/1997 | |
| WO | WO 01 00531 A1 | | 1/2001 | |
| WO | WO 01 60515 | | 8/2001 | |
| WO | WO 02/46101 A2 | | 6/2002 | |

OTHER PUBLICATIONS

Peramunage D. et al., *"Preparation and Battery Applications of Micron Sized $Ll_4Tl_5O_{12}$,"* Materials Research Society Symposium Proceedings, Materials Research Society, Pittsburgh, PA., U.S., vol. 498, No. 496, 1998, pp. 359–365.

Peramunage and Al. D, *"Preparation of Micron–Sized $Ll_4Tl_5O_{12}$, and its Electrochemistry in Polyacrlonitrile Electrolyte Based Lithium Cells"*, Journal of the Electrochemical Society, Electrochemical Society, Manchester, New Hampshire, U.S., vol. 145, No. 8, Aug. 1998, pp. 2609–2615.

* cited by examiner

PROCESS FOR MAKING LITHIUM TITANATE

This application claims priority from U.S. Ser. No. 60/306,683 filed Jul. 20, 2001 the entire contents of which is incorporated herein by reference.

The present invention relates to a process for producing lithium titanate, parts of the process, and the product of the process. In particular, the present invention relates to a process for producing tetra-lithium titanate spinel particles of well-controlled particle size in the range 5 to 2000 nm and corresponding to the stoichiometric formula $Li_4Ti_5O_{12}$. The lithium titanate may be from any suitable source. One aspect of the present invention relates to a process for preparing the lithium titanate.

BACKGROUND OF THE INVENTION

Lithium titanates are materials under development for the electrodes of lithium ion batteries. The crystal form $Li_4Ti_5O_{12}$ (spinel) particularly, because of its favorable intercalation properties, is the preferred form for secondary (rechargeable) batteries.

There are several known methods to make lithium titanate and particularly $Li_4Ti_5O_{12}$ spinel. For instance, U.S. Pat. No. 5,545,468 teaches a method to prepare lithium titanate by reacting titanium dioxide in the anatase or rutile form with lithium carbonate or hydroxide in the range 700° to 1000° C.

Recently, it has become apparent that a smaller particle size in the electrode material generally allows a faster charging rate of the lithium ion battery and a larger number of charging cycles without degeneration. Japanese patent application 09-309727 teaches a method to produce lithium titanate structures of long particles containing many voids with a longest dimension of 0.1 to 50 μm and a specific surface area of 1–300 m²/g. The particles are made by reacting a titanium and a lithium compound in solution, precipitating with ammonia, drying, and calcining.

Japanese patent application number 2000-302547 teaches a method to make lithium titanates by calcining a mixture of a titanium and a lithium compound following a multi-step heating and cooling program. The proposed process is stated to provide improved phase control and reduced loss of lithium compared to U.S. Pat. No. 5,545,468. It also allegedly provides cheaper processing without the wastewater treatment problems associated with JP 09-309727. It does not address, however, the issue of crystal size or specific surface area.

SUMMARY OF THE INVENTION

The present invention provides a process to produce lithium titanate crystallites economically and in industrial quantities. The process achieves good phase and size control in the range of 5 to 2000 nm (including between 10 to 2000 nm) and a BET surface area in the range of 1 to 400 m²/g. In general, the process includes providing a source of lithium titanate, crushing the lithium titanate to a particle size smaller than the desired particle size, and re-firing the lithium titanate under conditions to produce a final lithium titanate having a desired particle size with a narrow size distribution and controlled surface area.

In one aspect of the process, the lithium titanate is formed from a process that includes forming a blend that comprises titanium and lithium. The blend is evaporated to form a mixture of lithium and titanium compounds. The evaporation is conducted at a temperature above the boiling point of the liquid in the blend but below the temperature where significant reaction of the lithium and the titanium compounds occurs. The mixture is calcined to form lithium titanate. The calcined product may be washed to remove traces of soluble salts.

The lithium titanate is milled or crushed to a size smaller or equal to the desired size of the final product. The milled or crushed lithium titanate is spray dried. Optionally, the crushed lithium titanate may be re-fired under conditions to produce lithium titanate having a desired surface area and size distribution.

The blend of titanium and lithium can be provided from a variety of suitable sources. Accordingly, in one aspect of the invention, the blend of titanium and lithium is provided as aqueous chloride solutions of titanium and lithium. In a second aspect of the invention, the blend of titanium and lithium is provided as a suspension of an amorphous oxidized titanium compound in a lithium solution. In this case, the lithium solution can be formed from a source of lithium selected from the group consisting of lithium hydroxide, lithium chloride, lithium nitrate, lithium sulfate, lithium fluoride, lithium bromide, lithium oxide, and mixtures thereof.

In a third aspect of the invention, lithium titanate, made by any known means and crushed to a particle size smaller than the particle size of the final desired product, is used as the source of lithium and titanium for the re-firing step, where crystals are grown to the desired size.

As used in the following specification and appended claims, all percentages are by weight unless otherwise specifically indicated.

DESCRIPTION OF THE INVENTION

The present invention is a process to make lithium titanate with good phase and size control from lithium titanate, economically and in industrial quantities. The lithium titanate may be provided from a process to be described below or from any suitable source of lithium titanate.

In one aspect of the present invention, lithium titanate is made according to the following process. A blend is provided that comprises titanium and lithium. The blend is evaporated to form particles containing a mixture of lithium and titanium compounds. The evaporation is conducted at a temperature above the boiling point of the liquid in the blend but below the temperature where significant reaction of the lithium and the titanium compounds, or crystallization of lithium titanate occurs. The particles are calcined to form lithium titanate.

The lithium titanate is milled or crushed to a size smaller or equal to the desired size of the final product. Thereafter, the material is spray dried such that the spray-dried product, $Li_4Ti_5O_{12}$ can be used as is, can be micronized to form a micronized $Li_4Ti_5O_{12}$ final product, or can be re-fired. Typically, the milled lithium titanate is re-fired under conditions to produce lithium titanate having a desired surface area and size distribution.

Figure 1:
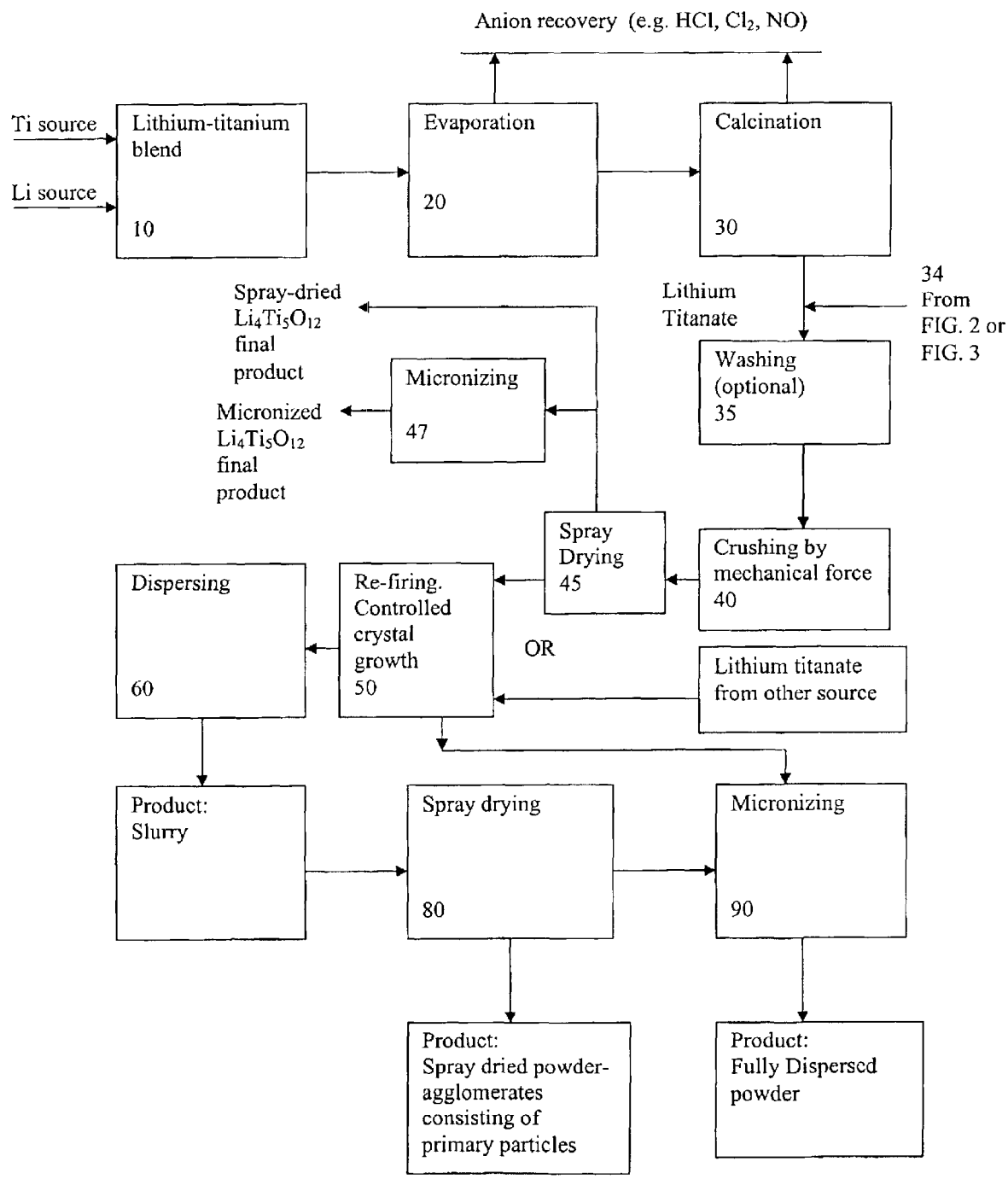
FIG. 1 is a flow sheet of the general aspect of the process according to one embodiment of the present invention.

Turning now to FIG. 1, a flow sheet according to the general process is shown. According to the present process, a titanium source is combined with a lithium source to form a blend 10. The titanium source may be derived from any suitable precursor as will be further explained below. Similarly, the lithium source may be derived from any suitable precursor as will be further explained below.

The blend is evaporated in an apparatus 20 to achieve total or near total evaporation. In other words, the solution is evaporated to form particles and so that less than about 5% to 20% water remains. The particles are calcined 30 to form lithium titanate particles. Desirably, the lithium titanate particles are organized in a thin film.

After calcination, the particles may be washed in water 35 to remove all traces of soluble salts from the product of the calcination step.

The particles are crushed 40 to a desired median size and size distribution. After milling, the particles are spray-dried 45 in a spray drier at a temperature from about 120° to about 350° C., and preferably from about 200° to about 250° C. After spray-drying, the lithium titanate is typically re-fired in a controlled temperature furnace 50 to produce particles having a desired surface area and size distribution. The product of the re-firing step consists of thermally treated agglomerates or aggregates. Alternatively, the spray-dried particles may be used as such or subjected to micronizing 47 to reduce the particle size to a desired particle size between 5 and 2000 nm (including between 10 to 2000 nm).

Where the lithium titanate is re-fired, thereafter, the aggregates produced from the refiring can be dispersed in a wet mill 60 or can be micronized 90. If the particles are dispersed, they may be further processed or may be left as is, i.e., as a slurry. Further processing may include spray drying 80 to produce spray-dried powder agglomerates that consist of primary particles. The spray-dried powder agglomerates may be sold or may be further processed by micronizing 90 to produce a fully dispersed powder.

The specific steps of the process will be explained in more detail below.

Lithium-Titanium Blend

As pointed out above, a blend of titanium and lithium is provided by providing a source of lithium and a source of titanium. This blend may be referred to herein as the lithium-titanium blend or the titanium-lithium blend.

Figure 2:
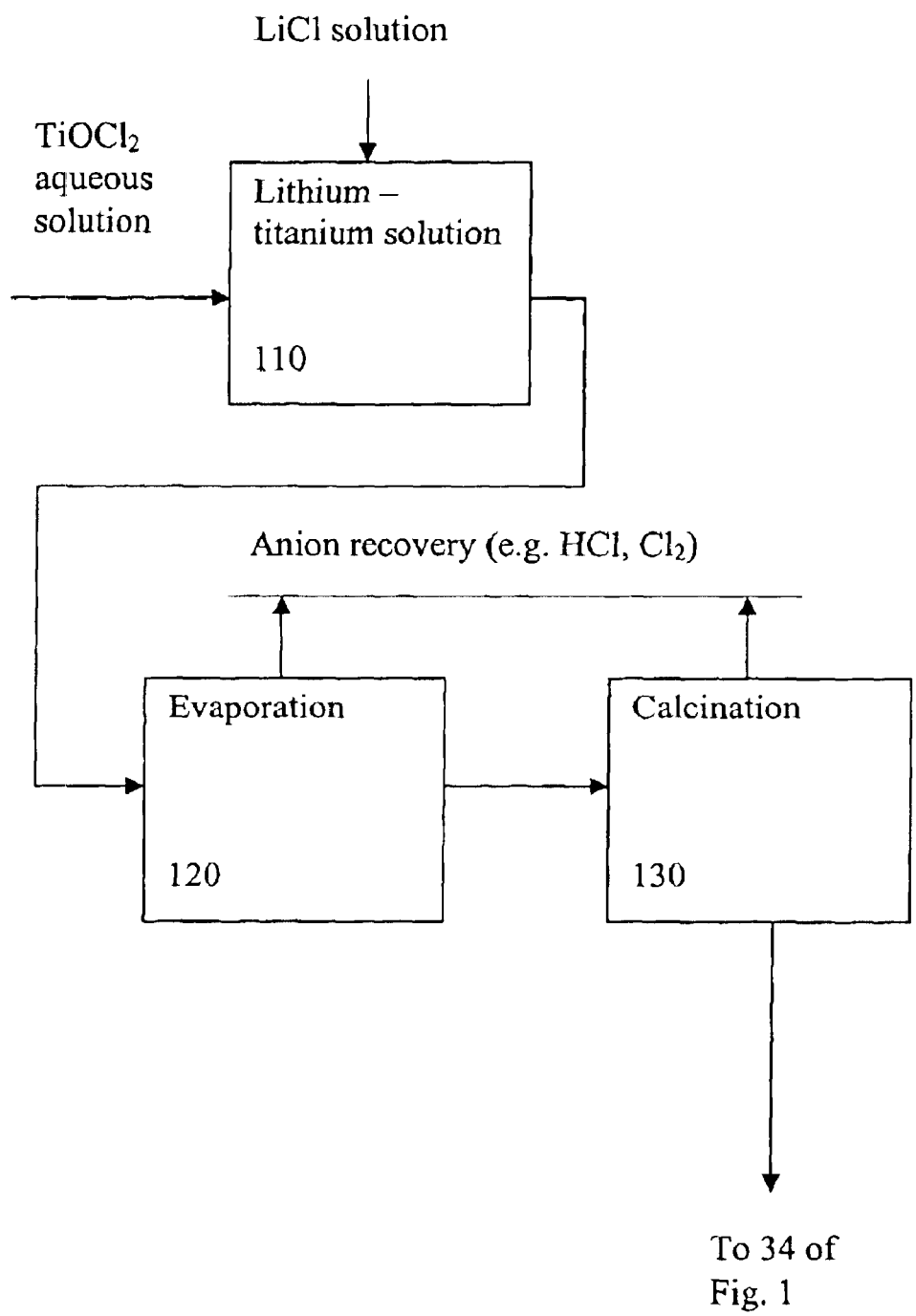
FIG. 2 is a flow sheet of the process according to another embodiment of the present invention, where the source of titanium is a titanium oxychloride solution and the source of lithium is lithium chloride.

For example, in one embodiment of the present invention, as shown in FIG. 2, the blend of titanium and lithium comprises a lithium-titanium solution 110 that can be prepared by combining an aqueous solution of titanium with an aqueous source of lithium. In particular, an aqueous titanium chloride solution is combined with an aqueous solution of lithium chloride. The aqueous solution of titanium chloride may be made by injecting anhydrous titanium chloride in water or a hydrochloric acid solution.

The aqueous solution of titanium chloride may also be derived from the processing of titaniferous ores with hydrochloric acid. For example, it may be derived from the processing of titanium ore according to U.S. Pat. No. 6,375,923, the entire contents of which are incorporated herein by reference.

An aqueous solution of lithium chloride may be obtained by dissolving lithium chloride or oxychloride in water or by dissolving a lithium compound, such as lithium carbonate or lithium hydroxide, in a hydrochloric acid solution. This lithium compound can, for instance, be dissolved in the acid titanium chloride solution formed as a first step.

Figure 3:
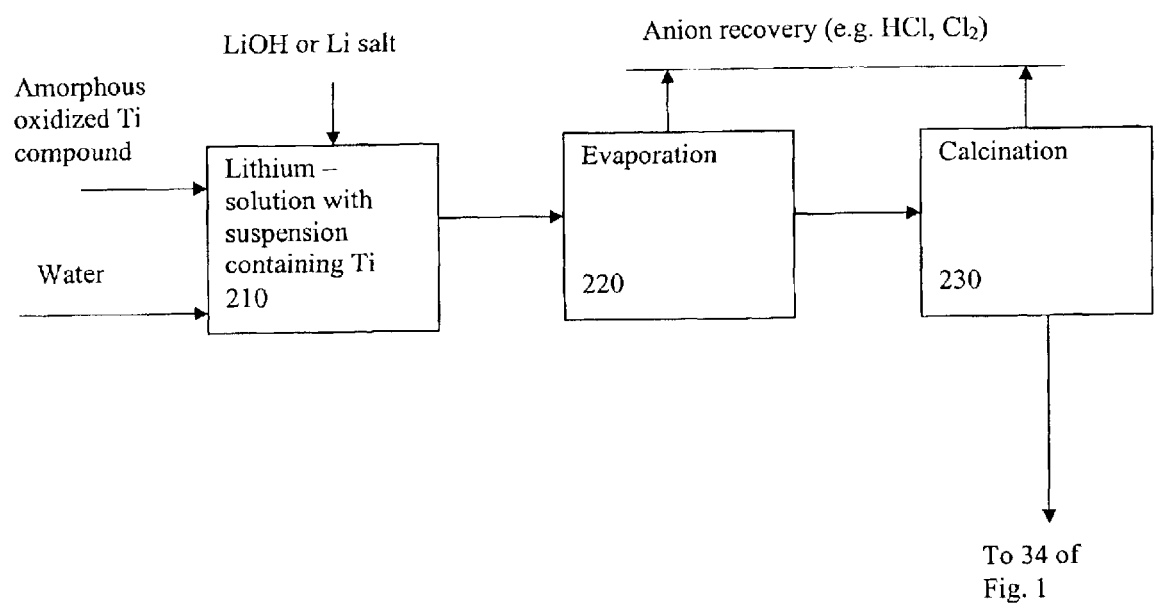
FIG. 3 is a flow sheet of the process according to another embodiment of the present invention, where the source of titanium is an amorphous oxidized titanium compound and the source of lithium is lithium hydroxide or a lithium salt.

In another embodiment of the present invention, as shown in FIG. 3, the blend of titanium and lithium 210 is a suspension of an amorphous oxidized titanium compound in a lithium solution. The titanium compound may be made by any means, including by precipitation from a titanium salt solution by addition of a hydroxide. It may also be made by using the intermediate product of the process described in U.S. patent Ser. No. 09/503,365 or of the process described in U.S. patent Ser. No. 09/503,636, the entire contents of which are incorporated herein by reference. The intermediate product to be used for the present process is the product of hydrolysis, before the calcination step described in the above incorporated by reference applications.

In these applications, the intermediate product is formed by converting a titanium salt in an aqueous solution together with optionally, minor quantities of any of several chemical control agents to a oxidized titanium solid in a process involving total, controlled evaporation of the solution and the formation of an amorphous titanium compound. This evaporation process is conducted above the boiling point of the solution and below the temperature where there is significant crystal growth.

The lithium for this embodiment of the present invention may be supplied as lithium nitrate, lithium chloride, lithium carbonate, lithium hydroxide, lithium sulfate, lithium oxide, lithium fluoride, lithium bromide or other soluble lithium compounds or their mixture.

Figure 4:
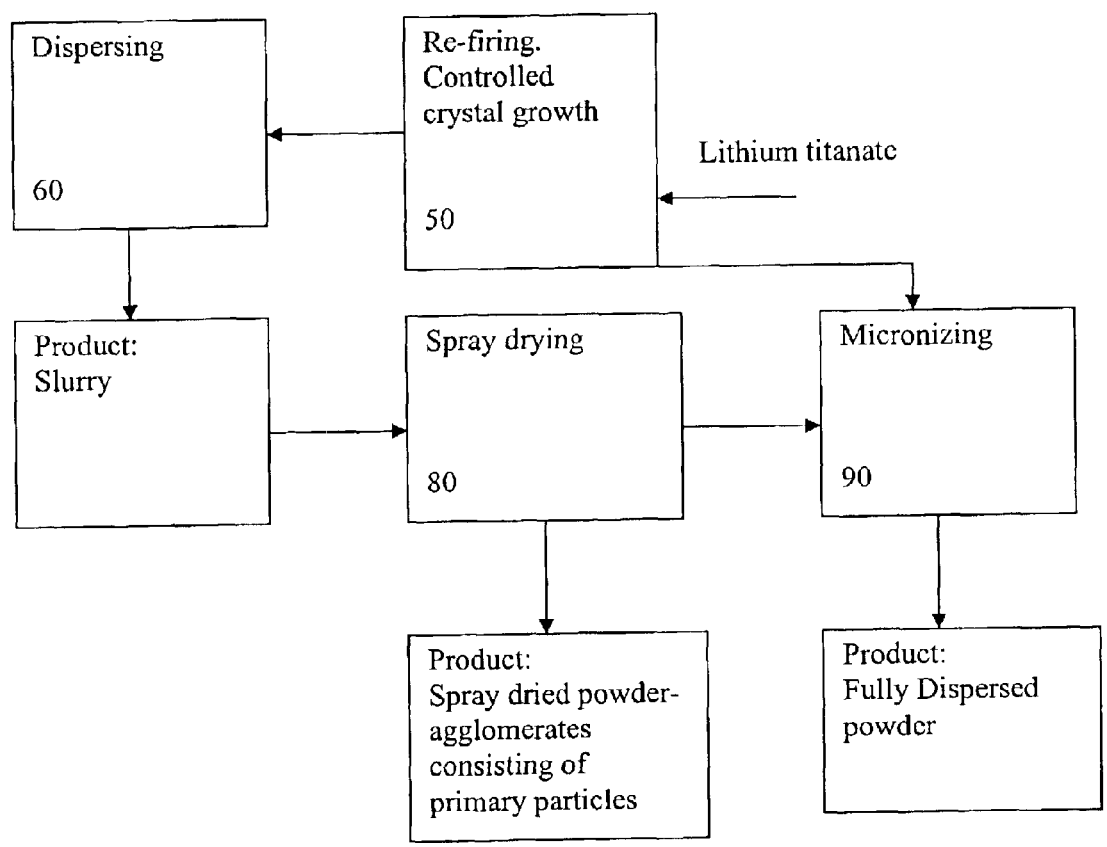
FIG. 4 is a flow sheet of the process according to the invention, where lithium titanate, made by any known means, is crushed to a size smaller than the required size, is subjected to a re-firing step and is subsequently dispersed.

In yet another embodiment of the present invention, as shown in FIG. 4, the lithium and titanium are provided as lithium titanate. The lithium titanate can be derived from any suitable process. In this embodiment, the lithium titanate feed material is subjected to crushing to a particle size smaller than the particle size of the desired product and is further subjected to firing and dispersion.

The ratio of titanium to lithium in the blend is adjusted to be equal to or slightly less than the Ti to Li ratio of the desired lithium titanium compound. To make the preferred lithium titanate spinel, $Li_4Ti_5O_{12}$, the ratio of the amount of Li to the amount of Ti (Li/Ti) corresponding to the stoichiometry is 0.116. A small excess of Li beyond the stoichiometric amount, e.g., up to 10% more than the stoichiometric amount, i.e. up to a weight ratio Li/Ti ratio of 0.128, may be added to take into account volatilization of Li salts during processing. It is possible to achieve 98% or better $Li_4Ti_5O_{12}$ phase purity.

One method of achieving good phase purity is to start by making a blend of lithium and titanium compounds with a Li/Ti ratio of 0.116, taking a small sample, drying and calcining it, measuring phase purity of this sample by X-Ray diffraction, and using this result to adjust the Li/Ti ratio as required.

With respect to the embodiment shown in FIG. 2, the concentrations of titanium in solution may vary over a wide range, but are generally in the range of 30 to 150 g/l Ti. A higher titanium concentration is generally more economical. With respect to the embodiment shown in FIG. 3, the amount of the titanium compound in suspension is generally in the range of 20% to 60% by weight.

Evaporation Process

After the blend of lithium and titanium is created, the blend is evaporated (20, 120, 220). The evaporation process is conducted above the boiling point of the liquid in the blend and below the temperature where significant reaction of the lithium and the titanium compounds occurs or where there is significant crystallization of lithium titanate. As a result of the evaporation, water and acid (e.g., hydrochloric acid, nitric acid, nitrous acid) are vaporized and may be recovered by any known process.

The evaporation process is performed in a manner to control the physical form of the product. Preferably, the evaporation process is accomplished by spraying the blend while it is heated at a temperature in the range from about 120° C. to about 350° C., and most preferably in the range from about 200° C. to about 250° C. This process may be conducted in a spray dryer.

With respect to the process depicted in FIG. 2, the evaporation process is conducted in such a manner as to form a film of a mixture of a lithium compound and an amorphous oxidized titanium compound. With respect to the process depicted in FIG. 3, the evaporation process is conducted in such a way as to form a thin film of lithium salt on the preexisting particles of the amorphous oxidized titanium compound.

In both cases, through control of the operating parameters, including temperature and concentration of titanium and lithium, the characteristics of the solid intermediate product can be reliably controlled within a fairly narrow range. For example, the product resulting from injection in a spray dryer according to the embodiment shown in FIG. 2, will generally be composed of hollow spheres or parts of spheres. The dimensions of the spheres may vary from less than 0.1 μm to 100 μm or more in diameter and a shell thickness in the range from about 30 nanometer to about 1000 nanometer or more. The structure of the shell consists of an intimate mixture of titanium and lithium compounds.

Evaporation by spraying under the conditions of the invention also has the advantage of direct processing of the solution so that a homogeneous intermediate product is formed and so that evaporation of water and acid is simultaneously accomplished. Preferably, from about 90% to about 99% of any aqueous material is evaporated.

Calcination

The product resulting from the evaporation step is calcined (30, 130, 230) at a temperature and for a length of time sufficient to convert the mixture of titanium and lithium compounds to lithium titanate of the desired structure and particle size. Calcination temperatures can range between about 600° C. to 950° C. Preferably, the calcination is conducted at temperatures ranging from about 700° C. to about 900° C. The calcination time varies over a wide range, from about 1 hour to as long as 36 hours. Preferably, the calcination time is in the range from about 6 hours to about 12 hours. Lower temperatures will require longer calcination times. The product of calcination shows a structure of individual units that can be broken up by milling into particles of the desired median size and size distribution.

During calcination, the lithium salt reacts with oxygen and water in the furnace atmosphere to release, for example, HCl gas or nitrous and nitric oxides or other gases formed by decomposition of the salt present in the original solution. These gases may be recovered. The calcination conditions are chosen such that contact with oxygen is sufficient to substantially convert the mixture of a lithium chloride salt and titanium dioxide to a lithium titanate with low impurity level.

Depending on the ratio of the amount of lithium and titanium present, different titanates such as $Li_4TiO_4$, $Li_2TiO_3$, $Li_4Ti_5O_{12}$, $Li_2Ti_3O_7$ may be formed. $Li_4Ti_5O_{12}$ spinal is the preferred form for Li intercalation electrodes, and is obtained for a ratio of Li to Ti (Li/Ti) of 0.116. As explained above, a slight excess of Li in the starting solution may be chosen to compensate for small losses of LiCl by volatilization.

Washing

The product of calcination may contain traces of the original lithium salt used as feed. To remove the traces of salt, the particles may be subject to one or several wash cycles. In each cycle, the particles are mixed with water and are separated by settling or filtration. The washing step is particularly useful if the lithium salt used is lithium chloride.

Milling or Crushing

After calcination and optional washing or if the lithium titanate is from the processes shown in FIG. 2 or 3, the lithium titanate is suspended in water. The suspension is circulated and milled in a horizontal or vertical pressure media mill to crush the titanate crystals to a size smaller or equal to the size desired in the final product.

Spray Drying and Micronizing

The product from the wet crushing process is dried in a spray drier 45 at a temperature from about 120 to about 350° C., and preferably from about 200 to about 250° C. The spray dried product may be used as final product. Alternatively, the spray-dried product may be micronized 47 and the micronized product may be the final product. Alternatively, the spray-dried product may be dispersed in water or other solvents to produce a dispersed slurry.

Re-Firing

Optionally, after crushing and spray-drying, the lithium titanate is re-fired in a controlled temperature furnace to make a product with a well-controlled specific surface area, consisting of regular-shaped crystals with a narrow size distribution. The refiring temperature is chosen to achieve the desired particle size and surface area of the product. In general, the re-firing temperature is between about 250° and 900° C., and the BET surface area of the re-fired product is in the range 1 to 400 $m^2/g$, with the higher refiring temperature corresponding to the lower specific surface area. Preferably, the refiring temperature is about 500° C.

According to the embodiment shown in FIG. 4 of the present invention, a lithium titanate, made by any known means, is subjected to crushing to a size smaller than the size desired in the final product and is re-fired to adjust its particle size to the required level, and may be subjected to one or more of the following subsequent steps.

Dispersing or Milling

After the refiring step, the product may be dispersed 60 to separate the agglomerates (i.e., liberate crystallites) formed during re-firing into distinct nano-sized particles by forming a water slurry of the product. The dispersion may also include wet-milling.

Alternatively, the product of the re-firing step may be micronized 90, e.g., dry-milled, preferably in a jet-mill.

Further Processing

Depending on the destination of the final product, the product from the dispersing step can be kept as a slurry, or spray-dried 80, or spray-dried 80 and micronized 90 (e.g., jet-milled) as indicated in FIG. 1.

According to the present process, a lithium titanate with a particle size between 5 and 2000 nm and with a BET surface area between 1 and 200 m$^2$/g can be produced.

The following examples illustrate, but do not limit, the present invention.

EXAMPLES

Example I

Five thousand two hundred kg of liquid anhydrous titanium tetrachloride was injected into a glass-lined, stirred, water-jacketed reactor containing 3 m$^3$ of a 3 M HCl solution. The maximum temperature during the injection process was 45° C. After the titanium containing solution had been cooled below 35° C., the reactor was opened and 922 kg of lithium chloride was added to form a titanium-lithium solution.

Part of the titanium-lithium solution was further injected into a spray dryer at a rate of 12 liter/h. The spray dryer was heated by gases produced by the combustion of natural gas, diluted with air to keep the temperature of the inlet gases at 600° C. The temperature of the outlet gases was 250° C. The solid intermediate product was recovered in a cyclone placed at the outlet.

Figure 5:
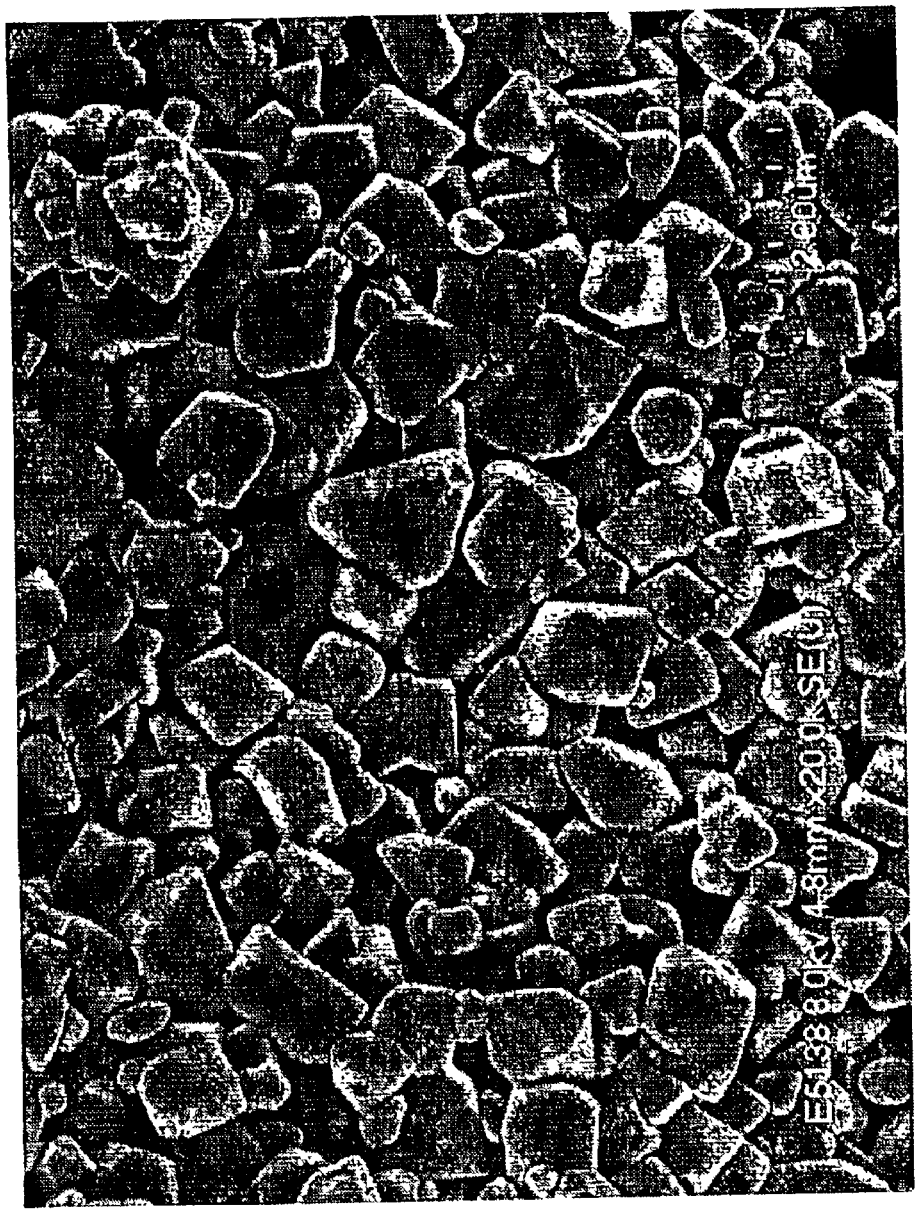
FIG. 5 is a scanning electron micrograph of the product of the process after calcining step 30.

For the calcination step, the product recovered in the cyclone was further calcined in an oxidizing atmosphere at a temperature of 800° C. for 12 hours. The product after calcination consisted of crystals of Li$_4$Ti$_5$O$_{12}$ of about 400 to about 1000 nm in size. FIG. 5 is a scanning electron micrograph of the product after calcination.

The product of the calcination step was further suspended in water and milled with zirconia grinding media for 8 hours. The BET surface area of this product was 135 m$^2$/g.

Example II

The product of example I was further spray dried, then placed in a ceramic tray and fired in a muffle furnace at 450° C. for 4 hours. The BET surface area of this product was 60 m$^2$/g.

Example III

Figure 6:
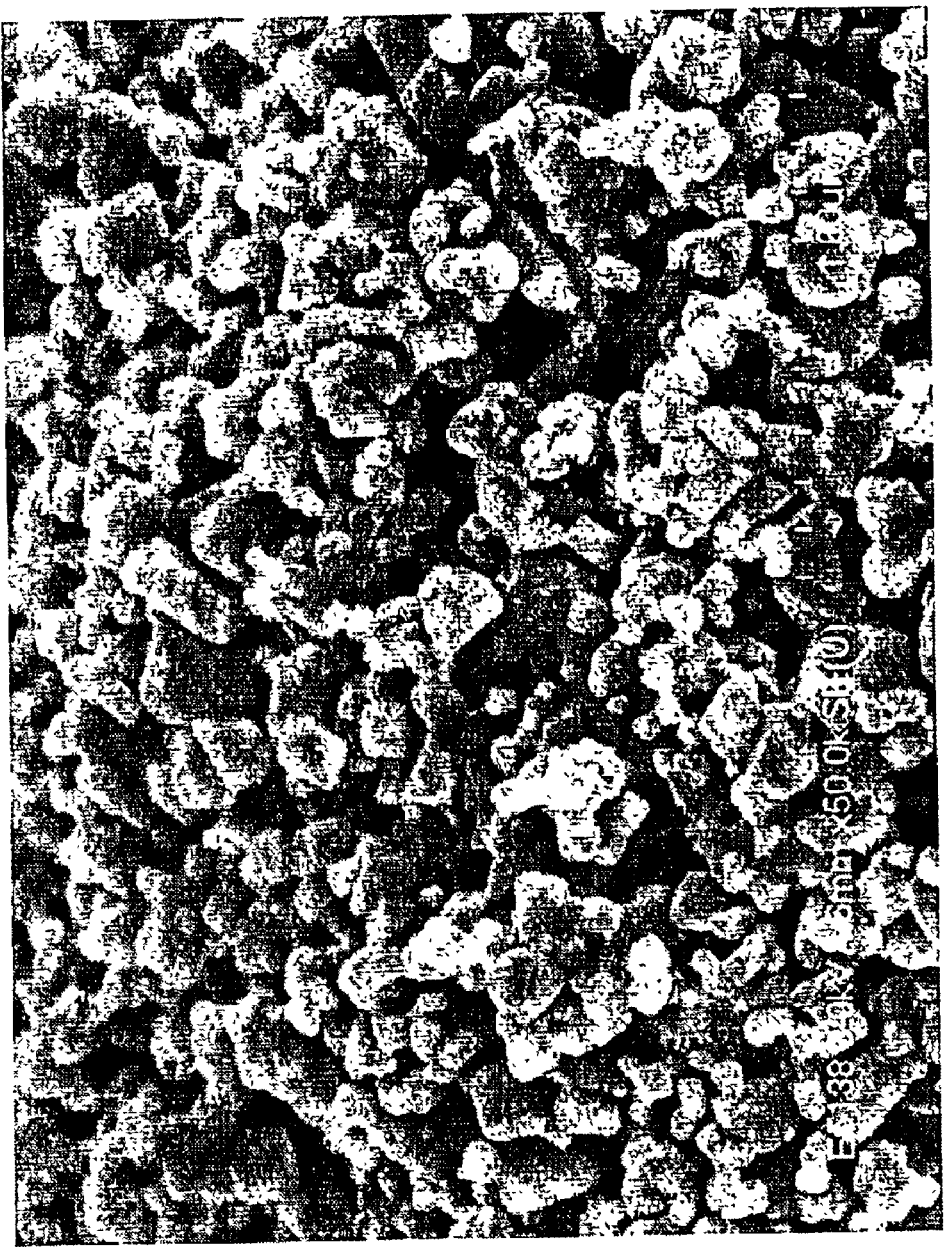
FIG. 6 is a scanning electron micrograph of the product of the process after crushing, drying and re-firing at 700° C., i.e., after step 50.

The product of example I was further spray dried, then placed in a ceramic tray and fired in a muffle furnace at 700° C. for 3 hours. The BET surface area of this product was 27 m$^2$/g. FIG. 6 is a scanning electron micrograph of this product.

Example IV

Two hundred kg of amorphous titanium compound containing 108 kg of Ti were made by injection in a spray dryer of a solution of titanium oxychloride according to the process of U.S. patent application Ser. No. 09/503,365. The material used was the amorphous intermediate product obtained after spray drying and before the calcining step. The amorphous Ti compound was dispersed into a lithium hydroxide solution in a double-shaft polyurethane-lined disperser. A total of 77.2 kg of LiOH.H$_2$O was used.

The suspension was further fed to a spray dryer operating in the same conditions as the spray dryer of example I.

The product of the spray dryer was further calcined, milled, dried and re-fired at 500° C. for 15 h. The BET surface area of the product was 60 m$^2$/g.

While there have been described what are presently believed to be the preferred embodiments of the invention, those skilled in the art will realize that changes and modifications may be made thereto without departing from the spirit of the invention. It is intended to claim all such changes and modifications that fall within the true scope of the invention.

What is claimed:

1. A process for producing lithium titanate comprising:
   a. preparing a blend comprising titanium and lithium;
   b. evaporating the blend to form a mixture of lithium titanium compounds, wherein the evaporating is conducted at a temperature above the boiling point of the liquid in the blend but below the temperature where significant reaction of the lithium and the titanium compounds occurs;
   c. calcining the mixture to form lithium titanate having a particle size between about 5 and 2000 nm and having a surface area between about 27 and 400 m$^2$/g.

2. The process of claim 1 further comprising crushing the lithium titanate.

3. The process of claim 2 further comprising spray drying the lithium titanate.

4. The process of claim 3 further comprising re-firing the spray dried product.

5. The process of claim 4 wherein the re-firing is conducted at a temperature between about 450° and about 750° C.

6. The process of claim 2 wherein the lithium titanate is crushed to a size smaller or equal to a size of a final lithium titanate product.

7. The process of claim 1 wherein the lithium titanate is washed before being crushed.

8. The process of claim 1 wherein the blend comprises an aqueous solution of titanium and lithium.

9. The process of claim 8 wherein the lithium is provided from a source selected from the group consisting of lithium chloride, lithium oxychloride, lithium nitrate, lithium hydroxide, and mixtures thereof.

10. The process of claim 8 wherein the solution comprises a mixture of titanium oxychloride and lithium chloride.

11. The process of claim 1 wherein the blend comprises a suspension of an amorphous oxidized titanium compound in a solution containing lithium.

12. The process of claim 1 where the evaporation process is conducted in a spray dryer.

13. The process of claim 1 where the evaporation process is conducted at a temperature between about 120° and about 350° C.

14. The process of claim 1 where the calcination process is conducted at a temperature between about 700° and about 900° C.

15. The process of claim 1 wherein the mixture comprises a film of an amorphous oxidized titanium compound and a lithium salt.

16. The process of claim 15 wherein the amorphous oxidized titanium compound is titanium dioxide and wherein the lithium salt is lithium hydroxide.

17. The process of claim 15 wherein the lithium salt is lithium chloride.

18. The process of claim 1 wherein the mixture comprises hollow spheres having a diameter between about 1 and 100 μm.

19. The process of claim 18 wherein the hollow spheres have a membrane thickness between about 30 nanometers and 1000 nanometers.

20. The process of claim 1 wherein the ratio of the amount of lithium to the amount of titanium in the blend (Li/Ti) is between about 0.116 and 0.128.

21. The process of claim 20 wherein the lithium titanate has a phase purity of at least 98% by weight $Li_4Ti_5O_{12}$ spinel.

22. A $Li_4Ti_5O_{12}$ formed by the process of claim 4.

23. The $Li_4Ti_5O_{12}$ of claim 22 having a particle size between 5 and 2000 nm.

24. A process to produce lithium titanate with a desired particle size between 5 and 2000 nm and a surface area between about 27 and 400 $m^2/g$ comprising calcining a lithium titanate with a particle size smaller than the desired size, wherein the calcining is conducted at a temperature between about 250° and about 900° C. so as to produce lithium titanate having said desired particle size and said surface area.

25. The process of claim 24 wherein the calcined product is dispersed to liberate crystallites.

* * * * *